United States Patent [19]

Davis, Jr.

[11] 3,802,308
[45] Apr. 9, 1974

[54] APPARATUS FOR MAKING PLASTIC BAGS
[75] Inventor: Francis A. Davis, Jr., Lansdale, Pa.
[73] Assignee: Paramount Packaging Corporation, Chalfont, Pa.
[22] Filed: Oct. 31, 1972
[21] Appl. No.: 302,614

Related U.S. Application Data
[60] Division of Ser. No. 92,735, Nov. 25, 1970, Pat. No. 3,739,694, which is a continuation-in-part of Ser. No. 82,257, Oct. 20, 1970, Pat. No. 3,654,841.

[52] U.S. Cl............................ 83/99, 83/100, 83/192, 83/374, 83/518, 83/620, 83/682, 83/683, 93/33 R
[51] Int. Cl............................ B26f 1/02, B26f 1/12
[58] Field of Search....... 83/99, 100, 192, 374, 214, 83/518, 620, 682, 683; 93/33 R, 33 H

[56] References Cited
UNITED STATES PATENTS
2,687,174   8/1954   Richens.............................. 93/33 R
3,545,323   12/1970  Rochla et al................. 93/33 R UX
3,595,139   7/1971   Adams et al....................... 93/33 R Primary Examiner—Frank T. Yost
Attorney, Agent, or Firm—Seidel, Gonda & Goldhammer

[57]  ABSTRACT

Apparatus is disclosed for making open-gusset bags from overlapping webs of thermoplastic material. A notch-perforator is provided along a side edge of the web for providing sets of notches and perforations or slits at spaced points along the web. V-shaped notches are applied to the gusset portion of the web and then the web is slit and welded transversely to divide the web into bags.

6 Claims, 7 Drawing Figures

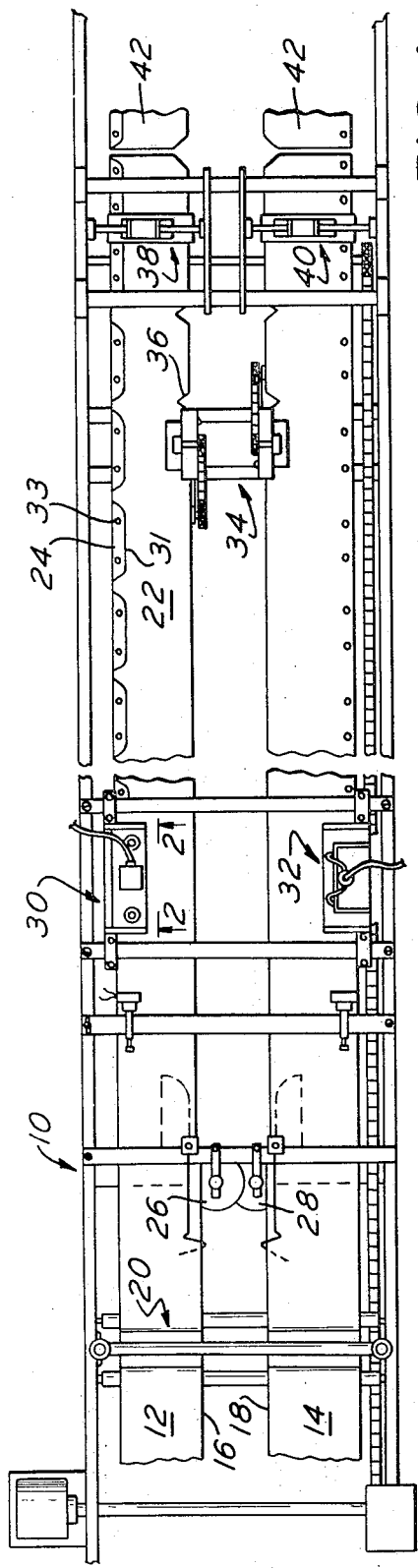
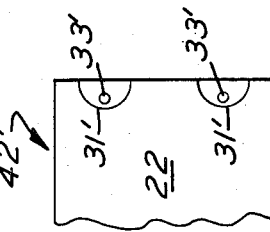
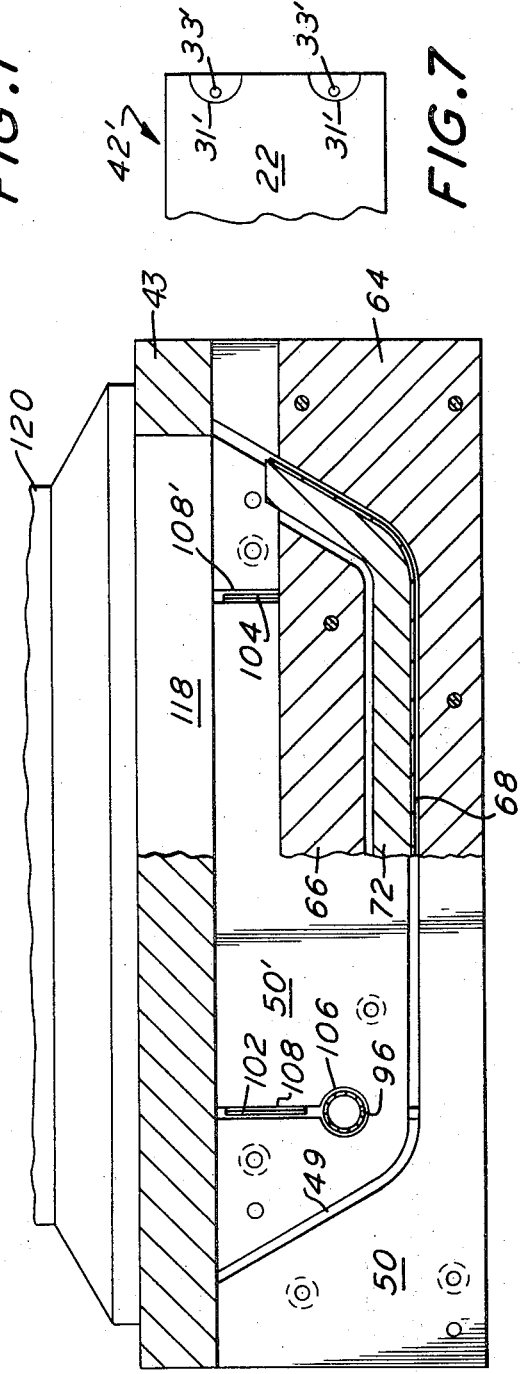

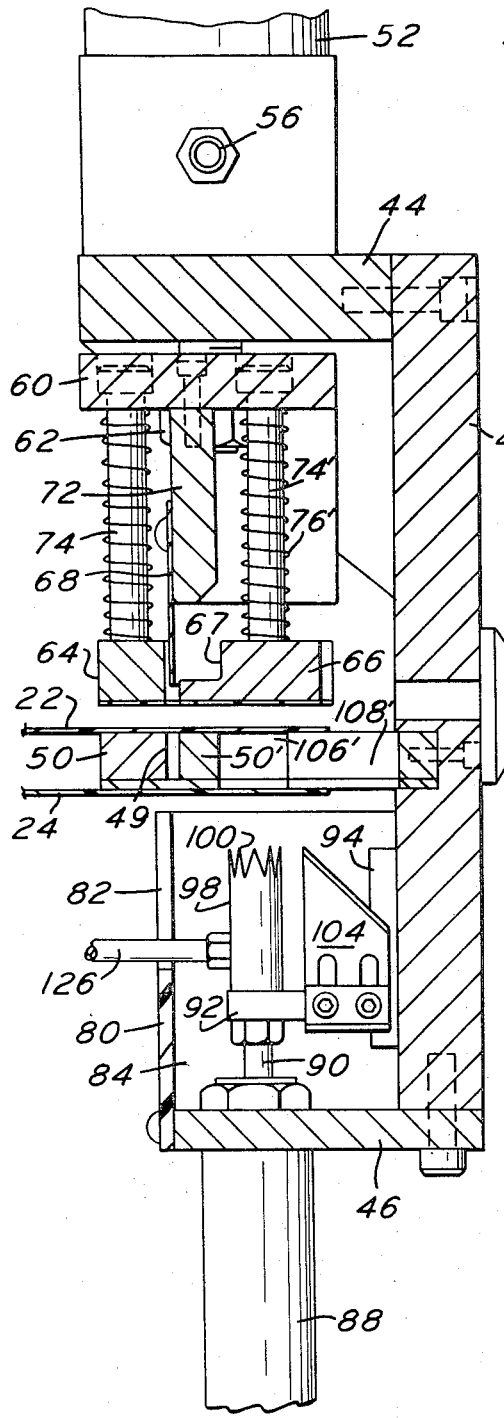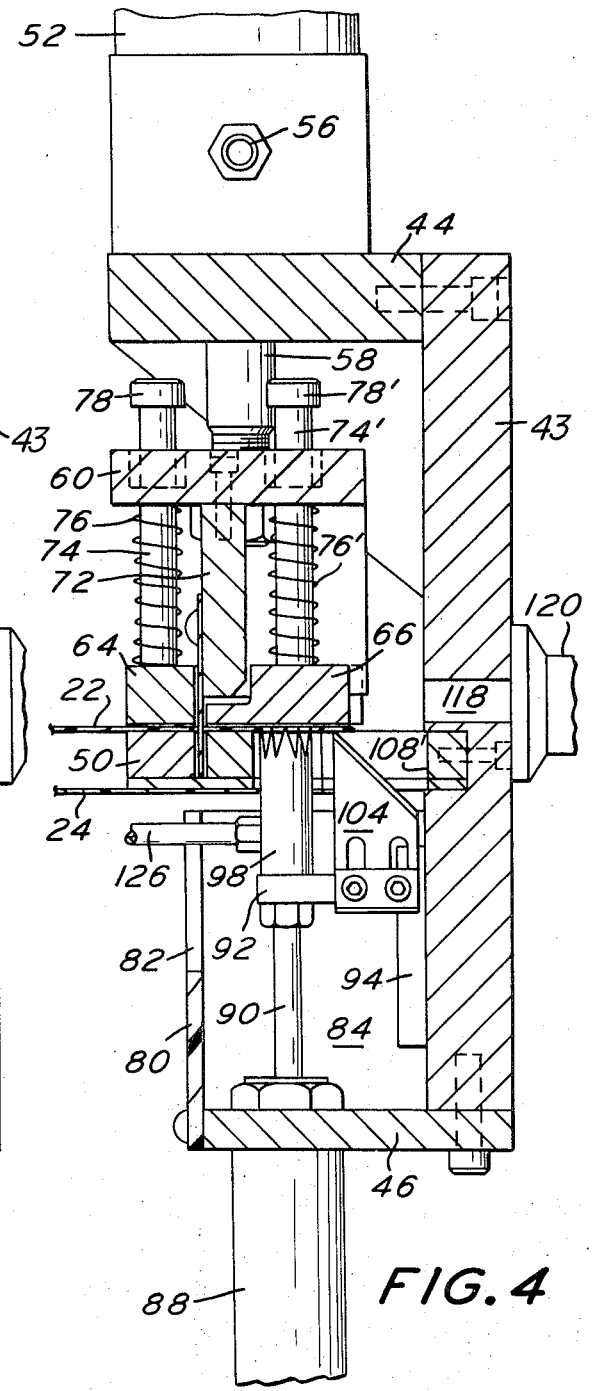
FIG. 3
FIG. 4

APPARATUS FOR MAKING PLASTIC BAGS

This is a division of copending U.S. Pat. application Ser. No. 92,735 filed Nov. 25, 1970 now U.S. Pat. No. 3,739,694 and entitled "APPARATUS FOR MAKING PLASTIC BAGS."

This application is directed to apparatus of the type disclosed in my U.S. Pat. No. 3,282,173 and is a continuation-in-part of my copending U.S. Pat. application Ser. No. 82,257 filed Oct. 20, 1970 and entitled Machine for Making Plastic Bags now U.S. Pat. No. 3,654,841. The disclosures therein are incorporated herein by reference.

When a web of thermoplastic material is folded so that it overlies itself and has a longitudinally extending fold-line, there are two layers of material, namely a top layer and a bottom layer. When a gusset is formed along the fold-line, in the gusset there will be four layers of overlapping material. When a notch is cut through the gusset and a weld provided at or parallel to the notch, as disclosed in said above-mentioned pending application, the top two layers will be welded together and the bottom two layers will be welded together so as to provide an open-gusset bag.

The side edges of the top and bottom layers of material, opposite the fold-line, are preferably aligned with one another. At the side edges of said top and bottom layers, the present invention includes a notch and perforator means for applying sets of notches and perforations or slits at spaced points therealong.

In the above-mentioned patent, the boom layer projected beyond the adjacent side edge of the top layer by a distance of approximately 1 inch so as to provide web material on which spaced sets of perforations or slits may be applied. The apparatus of the present invention eliminates the necessity of providing the projecting edge portion on the bottom layer, thereby saving one inch of material. At the same time, a stronger bag is produced since the entire length of the top and bottom layers will be welded together.

In accordance with the present invention, the top and bottom layers of an intermittently fed web are preferably separated from one another and simultaneously acted upon so that a notch is cut from the top layer and perforations or slits are provided in the bottom layer. During those portions of the processing time period wherein the web is stationary, the side edges of the web are notched and perforated, the gusset portion of the web is notched with welds being applied at or adjacent to the notches in the gusset, and one bag is separated from the web by a cutter-welder means.

It is an object of the present invention to provide apparatus for making plastic bags wherein the top and bottom layers at the open end of the bag will have at least one notch in the top layer and at least one perforation or slit in the juxtaposed portion of the bottom layer.

It is another object of the present invention to provide apparatus and method for making bags of the type disclosed in U. S. Pat. No. 3,184,055 without the necessity of a projecting portion for receiving the slits or perforations as disclosed in said patent.

It is another object of the present invention to provide apparatus for making plastic bags having notch and perforator means which is simple and reliable.

For the purpose of illustrating the invention, there is shown in the drawings a form which is presently preferred; it being understood, however, that this invention is not limited to the precise arrangements and instrumentalities shown.

FIG. 1 is a top plan view of the apparatus of the present invention.

FIG. 3 is a sectional view taken along the line 3—3 in FIG. 2 with the components thereof in an inoperative disposition.

FIG. 4 is a sectional view similar to FIG. 3, but showing the components in an operative disposition.

FIG. 5 is a sectional view taken along the line 5—5 in FIG. 2.

FIG. 7 is a partial plan view of another bag which may be made with the apparatus of the present invention.

Figure 2:
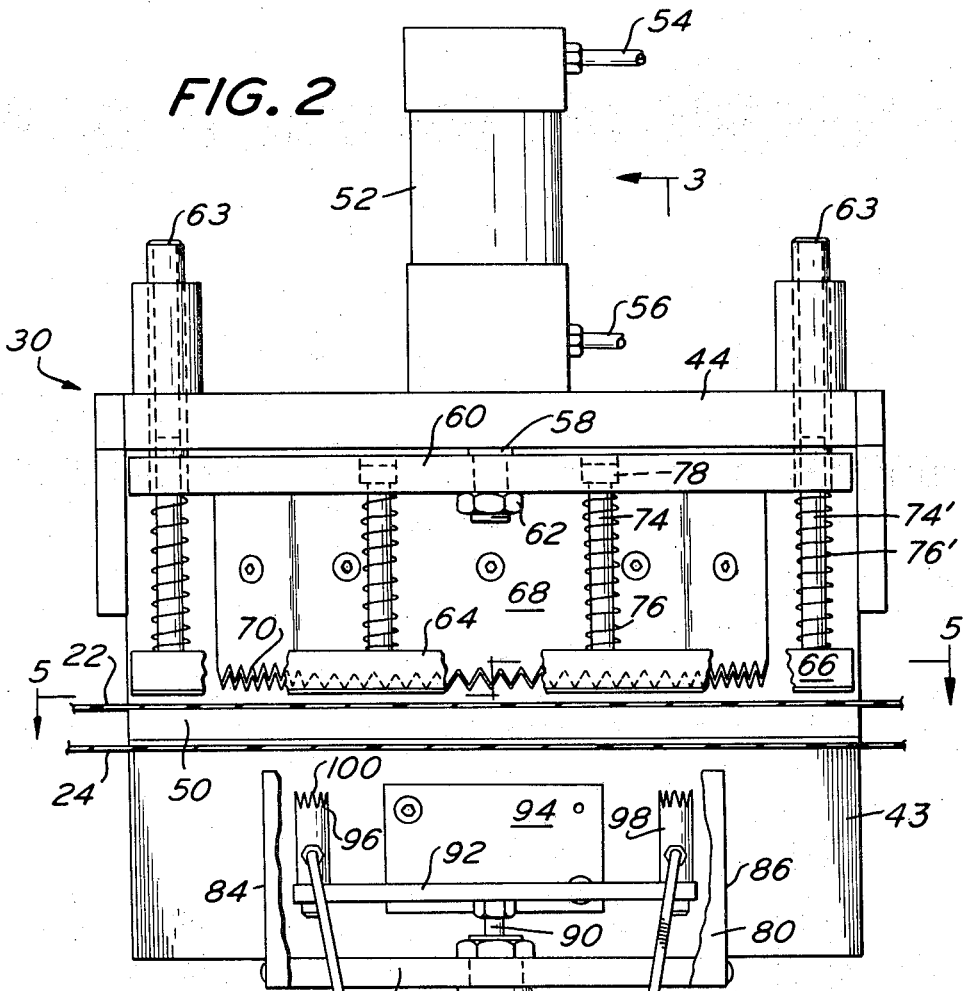
FIG. 2 is a side elevation view of the notch and perforator means taken along the line 2—2 in FIG. 1.

Referring to the drawing in detail, wherein like numerals indicate like elements, there is shown in FIG. 1 a top plan view of the apparatus in accordance with the present invention designated generally as 10. The apparatus 10 is intended to have fed therethrough a pair of spaced parallel thermoplastic webs 12 and 14. The apparatus 10 has two parallel production lines, each defined by one of the webs. The webs 12 and 14 are processed in the same manner except for the fact that one of the webs is upside down with respect to the other.

The web 12 is folded along fold-line 16 so that it overlies itself. Web 14 is similarly folded along line 18. Since each of the webs is processed in the same manner, only the processing of web 12 will be described in detail hereinafter. It will be understood that corresponding structure is utilized in conjunction with web 14.

The web 12 is continuously unwound from large rolls and fed through a capstan take-up roll assembly 20. When forming fold-line 16, the top layer 22 and the bottom layer 24 overlie one another. Preferably, neither the top layer nor the bottom layer protrudes beyond the other layer along a side edge of the web opposite the fold-line 16.

Along the fold-line 16, there is provided a rotatable gusset plate 26 which forms a gusset along the fold-line 16. A similar gusset plate 28 is provided which forms a gusset along the fold-line 18. The gusset plates are of the type disclosed in the above-mentioned patent. Any conventional means may be utilized to intimately feed the web 12 and operate the machine 10.

A notch and perforator means 30 is provided for notching and perforating or slitting the side edge of the web 12 opposite the fold-line 18. A similar means 32 is provided for the web 14. Since the printing on the layers of the web 14 is upside down from those on web 12, the means 32 is upside down with respect to the means 30. Otherwise, the webs 12 and 14 are processed identically.

The notch and perforator means 30 provides a notch 31 on the top layer 22 and a pair of perforations 33 in the exposed portion of the bottom layer 24. The manner in which this is accomplished will be described in greater detail hereinafter.

Downstream from the notch and perforator means 30, there is provided adjacent the gusset on webs 12 and 14, a notch and welder means 34 for providing V-shaped notches 36 in the gusset at spaced points therealong and correlated with respect to the position of the notches 31. The means 34 is preferably of the type disclosed in my above-mentioned copending application. Means 34 provides a similar V-shaped notch at the gusset of web 14. Downstream from the means 34, there is provided a cutter and welder means 38 for web 12 and a similar means 40 for web 14. The means 38 and 40 cut the webs transversely and provide a weld at or along the cut so as to divide the webs into bags 42. Means 38 and 40 may be of the type disclosed in the abovementioned patent wherein the seam weld is at the transverse cut or may be of the type wherein the seam weld is spaced from but adjacent to the transverse cut as disclosed in my copending U.S. Pat. application Ser. No. 775,748 filed Nov. 14, 1968 entitled Method and Apparatus for Making Plastic Bags, now U.S. Pat. No. 3,555,974.

The notch and perforator means 30, as shown more clearly in FIGS. 2–5, includes a vertical wall 43 having a top wall 44, a bottom wall 46 and a separator wall or die plate 50, 50'. Hence, the frame defined by these walls is E-shaped. The separator wall 50, 50' extends between the top layer 22 and the bottom layer 24 of the web 12. The components 50 and 50' are spaced from one another so as to define a gap 49 and each of the components is bolted to the wall 43.

A shoulder 52 is mounted on the wall 44. Conduits 54 and 56 are coupled to the cylinder 52 to facilitate supply and exhaust of motive fluid to the cylinder 52. The motive fluid is preferably air. A piston disposed within cylinder 52 is connected to the upper end of a piston rod 58.

The piston rod 58 extends through a bore in wall 44 and a bore in a plate 60. A bolt 62 is connected to the free end of the piston rod 58 with the plate 60 held against a shoulder on the piston rod 58. Plate 60 is guided with respect to the wall 44 by means of guide rods 62 extending through bushings on the wall 44.

Plate 60 is an actuator plate. First and second web retainers 64 and 66 are coupled to the actuator plate with a lost motion connection as will be made clear hereinafter. The web retainers 64 and 66 are spaced from one another so as to define a gap which is wider than gap 49 and overlies gap 49. A blade 68 having a serrated cutting edge at the lower end thereof is bolted to a blade support member 72. Support member 72 is fixedly secured to a bottom surface on the actuator plate 60. Blade 68 is aligned with the gap 40 and extends between the web retainers 64 and 66. Web retainer 66 is provided with a notched portion 67 so as to accommodate the blade support member 72 as shown more clearly in FIG. 4.

A plurality of posts 74 are secured at their lower ends to the web retainer 64 and extend through a bore in the actuator plate 60. A spring 76 surrounds each post 74 and biases the web retainer 64 away from the actuator plate 60 until a head 78 at the upper end of the posts 74 engages a shoulder surrounding the bore in plate 60.

The web retainer 66 is similarly coupled to the actuator plate 60 by means of posts 74' having an enlarged head 78' at their upper ends and springs 76' surrounding the posts 74'.

The coupling between actuator plate 60 and the web retainers 64 and 66 is a lost motion connection since the upward movement of the actuator plate 60 is not directly translated to upward movement of the web retainers 64 and 66 until after the heads 78, 78' contact a shoulder on plate 60. The lowermost surface on the web retainers 64 and 66 are preferably provided with a rubberized coating which contacts the top layer 22 before, during and after notching to prevent stretching the layer 22.

A front wall 80 is attached to the horizontally disposed bottom wall 46 and extends upwardly therefrom. The wall 80 is parallel to the wall 43 and connected thereto by side walls 84 and 86. The upper edge of walls 80, 84 and 86 is spaced from the separator wall 50, 50'. Wall 80 is provided with a notch 82 extending downwardly from its uppermost edge for purposes to be made clear hereinafter.

A cylinder 88 is secured to the wall 46 and depends therefrom. A piston within cylinder 88 is connected to one end of a piston rod 90. A spring, not shown, surrounds the piston rod 90 within the cylinder 88 and biases the piston in cylinder 88 downwardly.

The upper end of piston rod 90 is adjustably connected to a horizontally disposed mounting plate 92. Plate 92 is notched and guided for reciprocal vertical movement by a guide 94 bolted to the wall 43. A pair of cylindrical perforators 96 and 98 having a serrated edge 100 at their uppermost end is supported by the mounting plate 92. A blade 102 having an angularly disposed cutting edge is supported by the mounting plate 92. The blade 102 is directly behind the perforator 96 and lies in a vertical plane which contains the axis of the cylindrical perforator 96. The vertical plane is perpendicular to the wall 43. A similar blade 104 is associated with the perforator 98 in a similar manner. Bolts extend through elongated slots in the blades 102 and 104 so as to facilitate vertical adjustment of the angularly disposed cutting edge on these blades with respect to the mounting plate 92.

As shown more clearly in FIG. 5, the separator wall 50' is provided with a hole 106 through which the perforator 96 may extend in its uppermost disposition as shown in FIG. 4. A slot 108 extends from the hole 106 to the rear edge of the separator wall 50'. The blade 102 extends through the slot 108.

The separator wall 50' is provided with a second hole designated 106' through which the perforator 98 may extend. A slot 108', similar to slot 108, extends from the hole 106'. The blade 104 is adapted to extend through the slot 108'.

Figure 6:
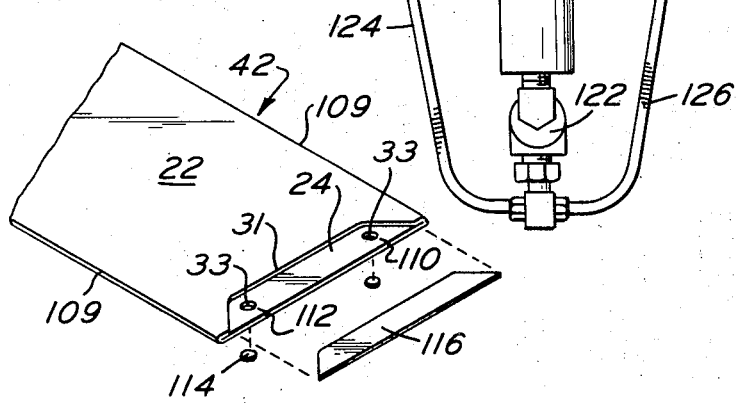
FIG. 6 is a partial exploded view of a bag made in accordance with the present invention and the portions removed from the web by the notch and perforator means.

The notch 31 on the bag 42 is cut from the top layer 22 by the blade 68. As shown in FIG. 6, the notch 31 includes a bight parallel to the edge defining the open end of the bag and converging side portions extending from the open end of the bag and inwardly from the side edges of the bag. In this manner, the top layer 22 may be welded to the bottom layer 24 along the entire length of the side edges 109 and the bag 42. This provides for a stronger bag which is less susceptible to being torn along a welded side edge 109.

When the elements shown in FIG. 3 move from the inoperative disposition therein to the operative disposition shown in FIG. 4, the tab 116 is cut out of the top layer 22 by the blade 68, thereby producing the notch 31, two disks 114 are produced as the holes 33 are cut by the perforators 96 and 98, and the slits 110 and 112 are produced by the blades 102 and 104. Due to the flimsy nature of polymeric material such as polyethylene or polyurethane, and the static electricity involved, a positive means must be provided to remove the scrap in the form of the tab 116 and the disks 114. Such means includes an opening 118 in the wall 43 aligned with a conduit 120 connected to a source of vacuum. Hence, the scrap will be sucked into the conduit 120 and discharged into a scrap container.

In order to remove the disks 114 from within the cylindrical perforators 96 and 98, means are provided for blowing the disks upwardly so that they may be sucked into the conduit 120. The air inlet conduit 122 for introducing air into the cylinder 88 is connected by a T-coupling to conduits 124 and 126. Conduit 124 communicates with the interior of perforator 96. Conduit 126 communicates with the interior of perforator 98. The slots 82 in the wall 80 accommodate the conduits 124 and 126 as will be apparent from a comparison of FIGS. 3 and 4.

As air is introduced into cylinder 88 to move the piston rod 90 upwardly, a check valve in the T-coupling prevents air from being introduced into the bottom of the perforators 96 and 98 by way of the conduits 124 and 126. On the return stroke of piston rod 90, the check valve opens and cylinder 88 exhausts into conduits 124 and 126. The serrations 100 at the upper end of the perforators 96 and 98 facilitate holding the disks 114 at the upper end of the perforators and the discharge of the pressurized air from within the perforators until the disks may be sucked into conduit 120 by way of the opening 118.

In view of the above, it is not deemed necessary to set forth a detailed sequence of operations. Each time the web 12 stops, means 30, 34 and 38 perform a function on the web 12 simultaneously. As soon as the web 12 stops moving, the components of means 30 move from the position shown in FIG. 3 to the position shown in FIG. 4 and then return to the position shown in FIG. 3. The separator wall 50, 50' at all times extends between the top and bottom layers 22 and 24 of the web 12.

The introduction of a motive fluid through conduit 54 into cylinder 52 causes the actuator plate 60 to descend from the position shown in FIG. 3. Air is simultaneously introduced into cylinder 88 to move the piston rod 90 upwardly from the position shown in FIG. 3. Blade 68 extends into the gap 49 and cuts the notch 31. Perforators 96 and 98 move upwardly to cut the holes 33 in the bottom layer 24.

When conduit 54 is exhausted and motive fluid introduced through conduit 56, the piston rod 58 moves upwardly from the position shown in FIG. 4. This causes the actuator plate 60 to move upwardly with the piston rod 58 until the heads 78 and 78' engage the shoulder in actuator plate 60. Thereafter, the web retainers 65 and 66 move upwardly with the actuator plate 60. Until the heads 78 and 78' bottom out in the actuator plate 60, the web retainers 64 and 66 do not move upwardly.

The retainers 64 and 66 remain in the position shown in FIG. 4 with their rubberized surface holding the top layer 22 against the uppermost surface on the separator wall 50, 50' until the blade 68 has been withdrawn. After the web retainers 64 and 66 have moved upwardly, the vacuum coupled to conduit 120 sucks the tab 116 and the disks 114 into conduit 120 through the opening 118. The piston rod 90 descends to the position shown in FIG. 3 before the web 12 commences movement so that the process may be repeated along the length of the web 12. It will be noted that the web retainers 64 and 66 engage the top layer 22 of the web 12 and hold the same firmly in position before the blade 68 passes through the web and into the gap 49. This assures a good clean cut without any puckering or stretching of the top layer 22.

As shown in FIG. 6, the notch 31 is of sufficient size so as to have a length greater than the distance between the pair of holes 33. If desired, a pair of notches 31' may be cut from the top layer 22, with each of the notches 31' overlying the area of the holes 33' as shown more clearly in FIG. 7 wherein there is illustrated a partial plan view of a bag 42' which may be made utilizing the present invention. Thus, the present invention may be utilized to produce one or more notches in the top layer 22 and the notches may be of varying configurations. In order to cut the notches 31', a pair of curved blades 68 will be utilized with corresponding gaps 49 being provided in the separator wall 50, 50'.

The cutting blade 68 which notches the top layer 22 and the perforators 96 and 98 are preferably on opposite sides of the web 12. Mounting and operation of the blades and perforators are easily facilitated for purposes of installation, actuation and maintenance when so constructed. It would be within the scope of the invention to mount the perforators 96 and 98 on the same side of the web 12 as the cutter blade 68, with the result that the tab 112 will be perforated when producing the perforations 33 in the bottom layer 24.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a notch and perforator means for notching one layer of a web and perforating a juxtaposed portion of a second layer of the web, said means including a notching blade movable toward and away from the first layer for notching the first layer, a pair of perforators movable as a unit toward and away from the second layer for providing spaced perforations in the second layer, and means for retaining the first layer firm so as to prevent stretching of the first layer while it is being notched by said blade.

2. Apparatus in accordance with claim 1 including a separator wall adapted to enter the space between said layers, said separator wall including a gap into which the notching blade may extend.

3. Apparatus in accordance with claim 1 including an actuator plate, said notching blade being supported by said actuator plate, said retaining means including first and second web retainers spaced from one another so that the blade may pass therebetween, said web retainers being coupled to said actuator plate and movable therewith to contact the first layer before the notching blade contacts the first layer.

4. Apparatus in accordance with claim 1 including a separator wall adapted to enter the space between said layers, said notching blade being on one side of said separator wall, and said perforators being on the opposite side of said separator wall.

5. Apparatus in accordance with claim 1 wherein said perforators are cylindrical and have a serrated edge, and a slitting blade aligned with the axis of each cylindrical perforator and mounted adjacent thereto for movement therewith to provide a slit in the bottom layer and extending inwardly from an edge of the bottom layer.

6. Apparatus in accordance with claim 1 including vacuum means for removing tabs produced by the notching of the first layer, and means for introducing pressurized air into the perforators for blowing out of the perforations cut from the second layer of the web.

* * * * *